W. A. CLARK.

Hollow Augers.

No. 5,393. Reissued May 6, 1873.

*Witnesses.*

Harry King.

W. D. P. King

*Inventor.*

Wm. A. Clark by Dodger & Son

Attys.

AM. PHOTO-LITHOGRAPHIC CO. N.Y. (OSBORNE'S PROCESS.)

UNITED STATES PATENT OFFICE.

WILLIAM A. CLARK, OF NEW HAVEN, CONNECTICUT.

IMPROVEMENT IN HOLLOW-AUGERS.

Specification forming part of Letters Patent No. 121,707, dated December 12, 1871; reissue No. 5,393, dated May 6, 1873; application filed April 17, 1873.

*To all whom it may concern:*

Be it known that I, WILLIAM A. CLARK, of New Haven, in the county of New Haven and State of Connecticut, have invented certain new and useful Improvements in Hollow Augers; and I do hereby declare that the following is a full, clear, and exact description thereof, reference being had to the accompanying drawing making part of this specification, and to the letters of reference marked thereon, like letters indicating like parts wherever they occur.

To enable others skilled in the art to construct and use my invention I will proceed to describe it.

My innvention consists of certain improvements in hollow augers, the first part consisting of a stop having an inclined or beveled shank held in place by a set-screw to prevent it from being accidentally displaced; the second point consisting of the combination of wedges and screws arranged to expand, and thus adjust or regulate the size of the hollow or opening in the center of the auger, all as hereinafter more fully explained.

Figure 1:
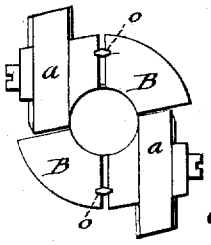
Figure 2:
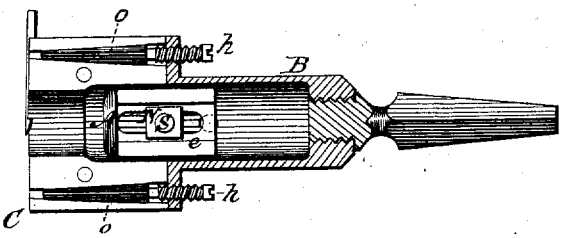
Figure 3:
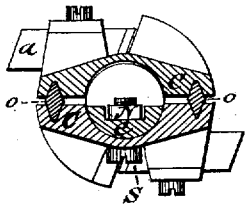

Figure 1 is an end view of the auger; Fig. 2, a longitudinal section; Fig. 3, a transverse section; and Fig. 4, a longitudinal section taken on a plane at right angles to Fig. 2.

Figure 4:
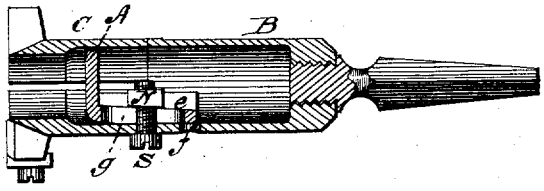

The body B of the auger is made tubular or cylindrical in form, and has a shank attached for holding it, when in use, in the usual manner. The end portion of the body C is spread out laterally, and is slit longitudinally, as shown in all the figures, for the purpose of permitting it to be expanded to adjust or enlarge the central opening when desired, by means of wedges *o*, all of which so far has before been done, and does not, therefore, constitute my invention. The stop consists of a round plate or head, A, which has a tail-piece or shank extending longitudinally from one side, at right angles to the head A, as shown in Fig. 4. The tail-piece *e* has a longitudinal slot, *g*, cut in it, and is also recessed along its face, as shown in Figs. 2, 3, and 4, thus leaving a rib projecting along each side to serve as guides, and as a seat for the reception of a square nut, N, in which a screw, S, engages after passing through a hole in the side of the body, and through the slot *g* of the stop. The shank or body *e* of the stop A, where it is slotted, is beveled or tapering lengthwise, growing gradually thicker toward its head, so that when set in position, and the screw S is tightened up, the stop is prevented from slipping or being pushed further in. This is a very important feature, inasmuch as in cutting the tenons on hard seasoned oak or hickory spokes or similar articles, considerable force has necessarily to be used to feed the cutters up to their work; and there, is, therefore, danger that the stop may be accidentally shoved in, and the tenon be cut too long, thus spoiling the work. By my improvement this is prevented, and at the same time the stop can be set or adjusted the whole length of the slot *g*, and, if desirable, can be set further back by taking the screw S out and inserting it through another hole, *f*, further back in the body B, and then screwing it into the nut as before.

By means of this stop not only can the length of the tenons be accurately regulated but their shoulders can be cut smoothly all around, as the stop, when the end of the tenon comes against it, stops the cutting gradually, thus leaving a perfectly true shoulder.

To adjust the size of the central opening in the head C of the auger the wedges O are inserted in suitable grooves between the opposite sides, as shown in Figs. 1, 2, and 3, and to adjust these wedges and hold them in place when adjusted, I insert behind each a screw, *h*, as shown in Fig. 2. By turning these screws the wedges can be forced toward the open end of the auger, thus expanding its sides and enlarging its opening, and at the same time the screws will hold the wedges firmly in place, and prevent them from being accidentally displaced. By these two means of adjustment the tool is greatly improved and made to work with great accuracy.

I am aware that a stop has before been used in a hollow auger, and also that the wedges have been applied; but neither of them with the means of adjusting and securing them, as herein described.

I do not claim a stop, nor the wedges, broadly, as applied to hollow augers; but What I do claim is—

1. The stop A having the beveled slotted shank *e*, constructed and arranged to operate in connection with a hollow auger, as herein set forth.

2. The combination of the wedges *o* and screws *h*, with the slotted head or tube C, of a hollow auger, substantially as and for the purpose herein set forth.

WILLIAM A. CLARK.

Witnesses:
J. McKINNEY,
PHILIP T. DODGE.